United States Patent [19]

Bodenbender et al.

[11] 4,294,368
[45] Oct. 13, 1981

[54] METAL SEALING CAP

[75] Inventors: Manfred Bodenbender, Kirchhain; Willy Reinhardt, Burgeln; Hermann Ritzenhoff, Marburg, all of Fed. Rep. of Germany

[73] Assignee: Firma Hermann Ritzenhoff, Marburg an der Lahn, Fed. Rep. of Germany

[21] Appl. No.: 120,466

[22] Filed: Feb. 11, 1980

[30] Foreign Application Priority Data

Feb. 16, 1979 [DE] Fed. Rep. of Germany ....... 2906065

[51] Int. Cl.³ ............................................ B65D 41/32
[52] U.S. Cl. .................................................. 215/256
[58] Field of Search ....................... 215/253, 254, 256; 220/270

[56] References Cited

U.S. PATENT DOCUMENTS 3,363,793  1/1968  Simons ........................... 215/256 X
3,469,727  9/1969  Acton .............................. 215/256 X
3,692,200  9/1972  Ritzenhoff ........................... 215/256

Primary Examiner—George T. Hall
Attorney, Agent, or Firm—Hopgood, Calimafde, Kalil, Blaustein & Judlowe

[57] ABSTRACT

The invention contemplates a formed-metal sealing cap especially adapted for removable closure of a bottle or the like container having contents under internal pressure. A circumferential pleat of the cap skirt forms the bottom rim of the upper reusable portion of the cap, and the lower portion of the cap is severably but integrally connected to the pleated region of the upper portion. In the forms described, the severable connection is via a tear-off strip of cap material which is circumferentially united to the upper reusable cap portion on a circumferentially extending locally weakened alignment, and the weakened alignment is enveloped by the pleated region. Thread-on and clinch-type cap-to-bottle embodiments are described.

12 Claims, 3 Drawing Figures

METAL SEALING CAP

BACKGROUND OF THE INVENTION

The present invention relates to a metal sealing cap especially suitable for closure of contaners with contents developing high inner pressure. More particularly, the invention relates to caps of the variety in which a cap lower part is removable from a cap upper part by means of a tear-off band, said tear-off band being used to connect the sealing cap securely to the container by flanging in, and in which the cap upper part is removably applicable to the container for reclosing the container, once the line of weakened strength connecting the cap upper part to the cap lower part has been ruptured.

Various metal sealing cap constructions are known, consisting of upper and lower cap parts which can be separated from each other with aid of a tear-off tab running along one or more lines of weakened strength. In some of these constructions, the lower cap part is securely connected to the container to be sealed, by flanging in or by contracting, and it remains on the container. In other constructions, as when only one line of weakened strength is provided and the entire lower cap part is a tear-off band, then the lower cap part is completely removed from the container upon initial opening of the pressure cap. The upper cap part is reusable, i.e., it is removably applicable to reclose the container, once the cap has been opened by tearing off the lower cap part.

Such sealing caps are intended to show that the container has been open. The intact condition of the whole cap guarantees the consumer the original contents of the container. Such a cap also ensures that contents of containers developing high inner pressure have been sealed satisfactorily; however, once the cap has been opened, the reapplied cap upper part no longer has the same ability to withstand inner pressure.

A sealing cap of the first-mentioned type is known, for example, in German published application 1,956,586 (Offenlegunschrift) where several individual thread segments are provided as a multiple-thread finish in the cap upper part, for engagement with a corresponding number of thread formations on the outside of the container finish. The thread segments on the sealing cap coact with the threads on the container in such manner that the cap-thread segments are located between the container-thread parts in a sealed condition while and after making the initial closure operation. Thus, the cap-thread segments and the container-thread parts, being in circumferential clearance and not in contact with each other, cannot interfere with or hinder the slightly rotational action of the cap before being axially pressed against the bottle, as roll action proceeds to flange in the cap lower part, to secure a sealed closure of the bottle.

Independent of the fact whether the cap upper part intended for later re-closing of the container is constructed as a screw cap or as a clinch cap, the disadvantage with closure caps of this known type to date is that a weakened edge is created upon tearing off the tear-off band along the line of weakened strength at the lower edge of the skirt of the cap lower part. Score formations which have thus far been applied at the lower region of the skirt of the cap upper part near the line of weakened strength do not reliably and sufficiently stiffen the skirt of the cap upper part to completely prevent the skirt from becoming deformed in the course of tearing the tear-off band; effective reusability of the cap is thus degraded or impaired. In the case of threaded caps, thread formations on the cap upper part tend to overturn because the cap has become oval due to the lack of sufficient stiffness in the cap skirt. On the other hand, the material thickness of the cap material cannot be selected in such thickness as to avoid such mishaps.

There is the further disadvantage that after removal of the tear-off band along the line of weakened strength on the lower edge of the skirt of the cap upper part, a sharp edge is created which can cause cuts or injuries to the consumer when reusing the cap upper part; this is particularly the case for threaded caps in which a turning motion between the fingers is required for reclosure.

BRIEF SUMMARY OF THE INVENTION

It is an object of the present invention to improve the reusability of a closure cap of the type described, and in particular to prevent deformation of the skirt of the cap upper part in the course of tearing the tear-off band.

Another object is to reduce the danger of injury to the consumer when reusing the cap upper part.

To solve this problem with a closure cap of the character indicated, the invention provides folds to achieve several overlapping thicknesses of the material of the cap upper part, in the region beside the line of weakened strength.

German published application No. 1,757,321 (Offenlegungschrift) discloses a bottle cap with a pocket formed by a double fold in the cap skirt. However, this pocket has the sole function of containing a tear-off thread and is destroyed by the tearing-off process.

A closure cap according to the present invention has the advantage that even with a small amount of material thickness, the lower region of the cap has such high stability that there is no distortion of the cap upper part when tearing the tear-off band; reusability either as a screw cap or as a clinch cap is thus fully guaranteed. In an embodiment of the cap upper part as a clinch cap, the folded region serves a tensile clinching function.

Because stiffness of the lower edge, i.e., of the lower edge of the cap skirt, is of utmost importance for any reuse of the cap upper part, this feature is ideally guaranteed by the cap construction of the present invention. In particular, when, in accordance with a further feature of the invention, two outer layers of material in the folded region form a downwardly closed fold and a third (inner) layer of material is bounded at its lower extremity by the line of weakened strength, and when said line of weakened strength is located diredtly behind (i.e., is fully enveloped by) the lower edge formed by the fold of the two outer layers of material, the danger of injury is completely removed because the free, torn-off edge is for all practical purposes covered by the fold of the two outer layers of material. This protective feature is enhanced if, according to the present invention, the line of weakened strength behind the lower edge formed by the fold of the two outer layers of material is located somewhat higher above the lower edge of the fold. The latter feature poses no technical problems of production since the weakened line can be scored prior to the folding operation.

DETAILED DESCRIPTION

The invention will be described for illustrative embodiments in conjunction with the accompanying drawing. In said drawings.

Figure 1:
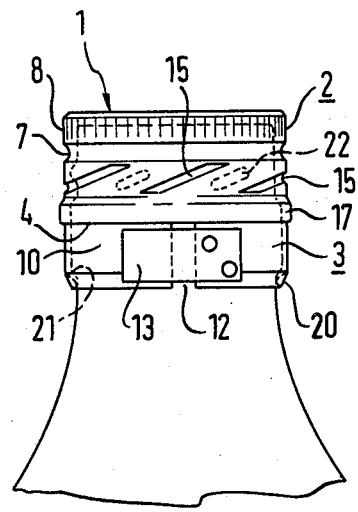
FIG. 1 is a side view of the head of a bottle, sealed with a closure cap according to the invention.

The entire cap numbered 1 is made from thin sheet metal, preferably aluminum sheet, and includes a cap upper part 2 and a cap lower part 3 which are connected to one another by a line of weakened strength 4. The cap upper part 2 is one piece of material consisting of a cap top 5 and a skirt 6 which for optical reasons or for reasons of stability can be provided with one or more circumferential contractions 7. At the upper edge, a vertical knurl 8 is provided to make the cap easier to grasp. An inlaid gasket 9 is held in place inside the cap upper part by means of the contraction 7.

Figure 2:
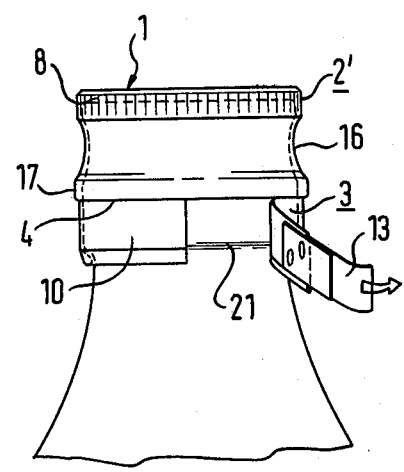
FIG. 2 is a view similar to FIG. 1, to illustrate another embodiment of the invention.
Figure 3:
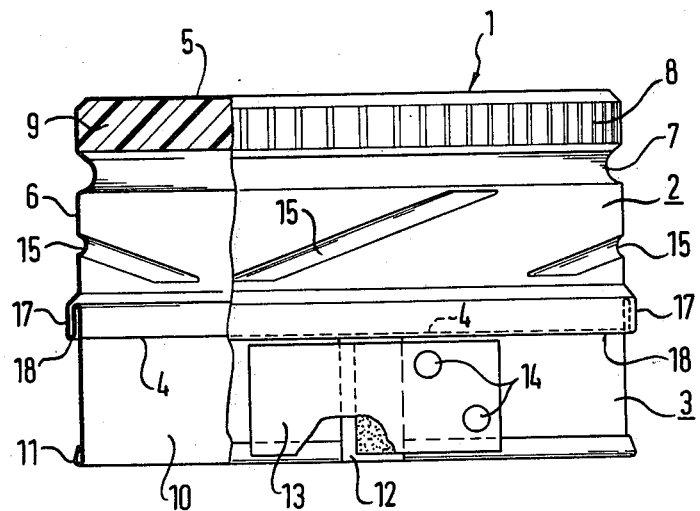
FIG. 3 is an enlarged side view of the closure cap of FIG. 1, the view being partly cutaway and in section, to reveal detail of cap-wall structure.

The cap lower part 3 which is connected with the cap upper part 2 by means of the line of weakened strength 4 is in the forms shown a circumferential tear-off band 10 with a lower rolled-in edge 11; band 10 is interrupted in its entire height at 12 and has an opening 12 by means of which a grip tab 13 is attached at one end, in known manner, for instance by welding through holes at locations 14 in band 10. In the construction of FIGS. 1 and 3, several thread formations 15 have been pressed into the skirt 6 of the cap upper part 2. In the construction of FIG. 2, the skirt 16 of the cap upper part 2' has been given a slightly concave shape so that the cap upper part 2' may serve as a clinch cap, as described below.

The skirt 6 or 16 of the cap upper part 2 or 2' has been folded as a circumferentially continuous pleat at its lower region, i.e., the region which extends above the line of weakened strength 4, thus establishing a reinforced region 17 by means of several, in the form shown three, layers of material. In the form shown, the two outer layers define a downwardly closed fold which circumferentially laps over the line 4 of weakened strength, and said line 4 is preferably above the lower limit of this downwardly closed fold.

In use to seal a bottle, for example, with contents developing high inner pressure, the closure cap 1 according to FIG. 3 is placed on the bottle head and is then pressed in the bottling machine by means of a plunger, thus pressing the gasket 9 together and sealing the bottle securely against inner pressure by flanging in the area 20 of the cap lower part 3, the same being clinched onto the bottle behind a projection or bead of the bottle head 21. In the embodiment having multiple threads, the thread segments 15 are circumferentially located between thread parts 22 which characterize the outer finish of the bottle head. Thus, the multiple threads 15–22 are not in contact with each other (i.e., they are in circumferential clearance with each other) so that the first sealing process described above is not influenced in any way by the possibility of the material springing back. For the initial opening of the closure cap, the tear-off band 10 which forms the cap lower part 3 in the construction forms shown is torn along the line of weakened strength 4 with help of the grip tab 13 according to FIG. 2. The cap upper part 2 or 2' remains as a reusable, independent closure cap and can be used according to FIG. 1 as a screw cap with multiple threads or according to FIG. 2 as a clinch cap. The folded region 17 defines the lower edge of the cap upper part 2 or 2', now an independent cap, and region 17 provides the strength and stabiltiy needed for it to serve the purposes of part 2 as an independent cap. The folded region 17 also prevents deformation of the skirt 6 or 16 in the course of tearing the tear-off band 10 along the line of weakened strength 4. In the embodiment wherein the cap upper part 2' is a clinch cap, the folded region 17 gives the cap skirt 16 the necessary hoop-tensile to ensure its use as a clinch cap. After the tear-off band 10 has been torn along the line of weakened strength 4, the inner layer of material of the folded region 17 has a sharp edge which could cause injuries. This edge, however, is for all practical purposes covered by the lower edge of the downwardly closed fold of the two outer layers of material, so that subsequent use of the cap upper part 2 or 2' as an independent closure cap is free of any danger of injury or of any undesirable distortion of the torn lower edge.

While the invention has been described in detail for the preferrred embodiments shown, it will be understood that modifications may be made without departure from the claimed scope of the invention. For example, if desired, to facilitate grasping the outer layer of the folded region 17 may be formed with a knurl.

What is claimed is:

1. A metal sealing cap consisting of a cap upper part and a cap lower part removable from said cap upper part with aid of a tear-off band and by means of which cap lower part the sealing cap is securely sealed with the container by flanging in, the cap upper part of said sealing cap being removable from the container by rupturing a line of weakened strength connecting the cap upper part with the cap lower part, wherein the skirt of the cap upper part bordering on the line of weakened strength has been constructed as a folded area of at least three overlapping thicknesses of material, a first and second outer layer of material in the folded area forming a closed fold downwards and the second layer forming together with an inner third layer a closed fold upwards, the third inner layer of material being bounded at its lower perimeter by the line of weakened strength, characterized in that the line of weakened strength is axially overlapped by the lower edge formed by the downwardly closed fold of the two outerlayers of material, whereby upon rupture along the line of weakened strength, the downwardly closed fold circumferentially encloses the edge along which the line was ruptured.

2. A metal sealing cap consisting of a cap upper part and a cap lower part removable from said cap upper part with aid of a tear-off band and by means of which cap lower part the sealing cap is securely sealed with the container by flanging in, the cap upper part of said sealing cap being removable from the container by rupturing a line of weakened strength connecting the cap upper part with the cap lower part, wherein the skirt of the cap upper part bordering on the line of weakened strength has been constructed as a folded area of at least three overlapping thicknesses of material, a first and second outer layer of material in the folded area forming a closed fold downwards and the second layer forming together with an inner third layer a closed fold upwards, the third inner layer of material being bounded at its lower perimeter by the line of weakened strength, characterized in that the line of weakened strength is axially overlapped by the fold of the two outer layers of material at a location above the lower edge formed by the fold of the two outer layers of material, whereby upon rupture along the line of weakened strength, the downwardly folded two outer layers circumferentially enclose the edge along which the line was ruptured.

3. A metal sealing cap according to claim 1 or claim 2 wherein the layers of material forming the folded area are pressed firmly together.

4. A metal sealing cap according to claim 1 or claim 2, wherein several individual thread filaments for multiple threads have been provided in the skirt of the cap uppper part along with the corresponding number of thread parts on the outside of the container finish where the thread filaments are located beside or between the thread parts when the cap is sealed for the first time by flanging in the cap lower part behind a projection on the outside of the container.

5. A metal sealing cap according to claim 1 or claim 2, wherein the cap upper part can be used as a separate clinch cap after removal of the cap lower part.

6. A metal sealing cap according to claim 5, wherein the folded area serves as a tensile clinching area of the cap upper part when pushed onto the container.

7. A unitary metal sealing cap comprising a cap upper part and a cap lower part that is axially contiguous to and severably removable from said cap upper part, said cap upper part having a skirt portion with a circumferentially continuous pleat at its lower edge, said cap lower part being a sleeve having a circumferentially extending line of severably weakened strength integrally connecting the same to said skirt portion, said pleat having two outer axially overlapped layers defining a downwardly closed fold which circumferentially overlaps said line of weakened strength, said cap lower part having a circumferentially extending inwardly deformable region adapted for flanged-in retaining engagement to a bead or the like formation at the mouth of a container to be sealed by said cap.

8. The cap of claim 7, in which said cap lower part includes a circumferentially extending tear-off band adjacent said severably weakened connection.

9. The cap of claim 7, in which said skirt portion of cap upper part includes thread formations for removable threaded engagement with container-thread formations after severance of said cap lower part.

10. The cap of claim 7, in which said skirt portion of said cap upper part includes a circumferentially continuous radially inward formation for removable clinch-action retention with a container-neck groove formation after severance of said cap lower part.

11. The cap of claim 7 in which a circumferentially continuous externally exposed region of said cap upper part is characterized by knurl formations.

12. A metal sealing cap according to claim 1 or claim 2, in which said inner third layer and said tear-off band are characterized by substantially the same cylindrical radius at least in their adjacency to the line of weakened strength.

* * * * *